Jan. 6, 1953 V. B. BUTLER 2,624,532
AIRCRAFT WING FLAP
Filed Sept. 7, 1949

Van B. Butler
*INVENTOR.*

BY James M. Clark

HIS PATENT ATTORNEY.

Patented Jan. 6, 1953

2,624,532

UNITED STATES PATENT OFFICE 2,624,532

AIRCRAFT WING FLAP

Van B. Butler, Seattle, Wash., assignor to Boeing Airplane Company, a corporation of Delaware Application September 7, 1949, Serial No. 114,338

16 Claims. (Cl. 244—42)

1

The present invention relates in general to aircraft wings provided with trailing edge flaps and more particularly to improvements in the mounting and operating mechanisms for flaps and similar auxiliary surfaces.

Aircraft wings are normally provided with high-lift trailing edge flaps which are usually extended rearwardly and downwardly to optimum positions to change the lift and drag characteristics of the wing with which they are associated to provide improved landing and take-off conditions. These trailing edge flaps are usually of the slot-forming type in order to provide efficient air flow characteristics over the main wing or airfoil while the flaps are in their extended operative positions; and the flaps preferably form a streamlined continuation of the main wing in their retracted positions wherein they offer a minimum of interruption to the continuity of the upper and lower surfaces of the main wing. Such trailing edge flaps are normally provided with operating means of an irreversible type which may be either mechanical, hydraulic or electrical, and since the air loads upon the flap in its extended positions at cruising or high speed of the aircraft are relatively high and disastrous to the flap and its mounting structure, expedients have heretofore been proposed to either prevent extension of the flaps under such conditions, or to resiliently permit their deflection under such excessive loads.

The present invention is directed to an improved safety mounting and operating mechanism for trailing edge flaps which includes a resiliently collapsible strut element which assists in maintaining the flap in its retracted and extended positions and is also such that it relieves the flap of any excessive loads to which it may be subjected. The present invention is also directed to an improved mounting arrangement for a trailing edge flap in which additional lift may be derived from the flap when projected and retained at partially extended positions by the abovementioned strut element and an articulated knuckle member of unique arrangement and function. The improved mechanism of the present invention also includes a rectilinearly movable carriage for the aforementioned resilient strut and articulated support of the flap and a straight track for the guidance of the carriage, as opposed to the curved tracks which in use heretofore have proven costly to construct and presented difficulties in their operation.

It is, accordingly, a major object of the present invention to provide an improved mounting,

2 support and operating mechanism for a high lift trailing edge flap. It is a further object to provide an improved safety feature for an aircraft flap in which it may be relieved of excessive loads to which the flaps may be subjected in flight. It is a further object to provide a flap support and operating mechanism for projecting the flap to partially extended positions at which additional lift may be obtained from the flap. It is a further object to embody in a flap operating mechanism a resiliently collapsible safety element which not only relieves the flap from becoming overloaded as set forth above, but additionally assists in holding the flap in its extended positions, and also in retaining the flap in its faired retracted position. Further objects of the present invention incorporate improvements in the arrangements and details of the resiliently collapsible strut, the straight guide track, the articulated knuckle member for supporting and positioning the flap, and the other elements forming essential parts of the improved mechanism.

Other objects and advantages of the present invention, both with respect to its general arrangement and the details of its several parts, will become apparent to those skilled in the art after reading the following description and the accompanying drawings forming a part hereof, in which.

Figure 1:
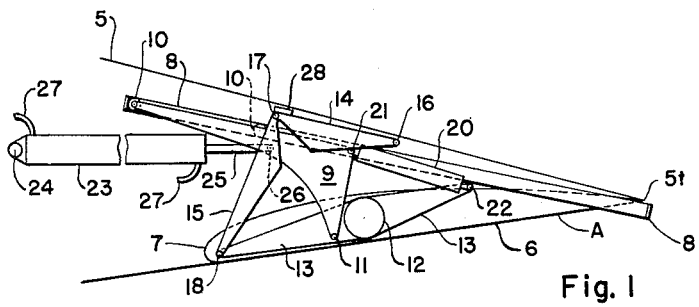
Fig. 1 is a sectional elevational view of the trailing portion of a wing to which a flap is mounted in its retracted position by a form of the present mounting and operating mechanism.
Figure 2:
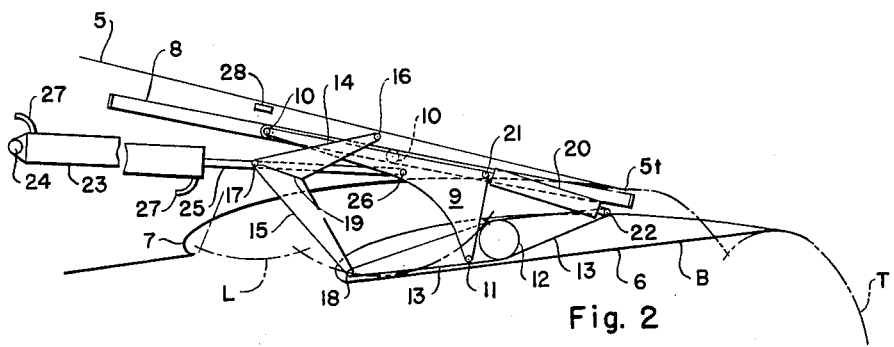
Fig. 2 is a similar view of the flap and its associated mechanism in a partially extended position.
Figure 3:
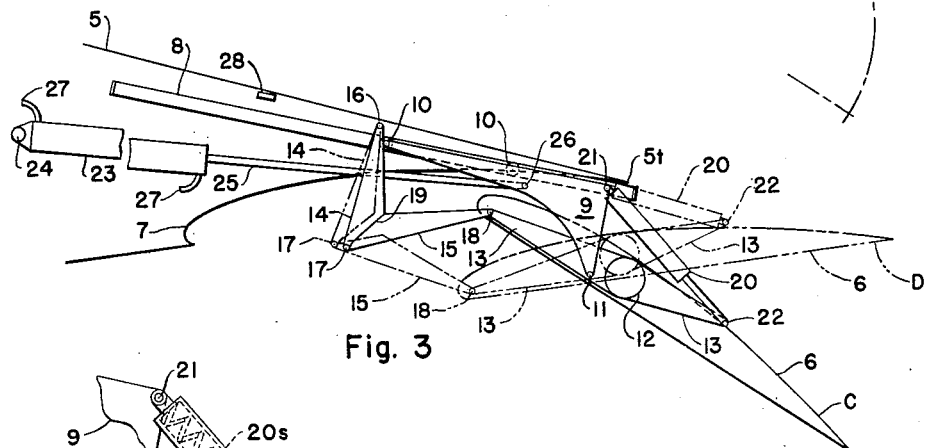
Fig. 3 is a similar view of the flap and its mechanism shown in both a fully extended position and an unloaded position in which it has been relieved of excessive air loads.

The numeral 5 in each of Figs. 1, 2 and 3 represents an airfoil or wing to the trailing portion of which there is operatively supported a high-lift flap 6. The lower side of the trailing portion of the wing 5 is provided with a recess 7 into which the flap 6 may be completely retracted as shown in Fig. 1 into a position in which it forms a streamlined continuity with the undersurface of the wing and may intersect the trailing edge 5t thereof to form a split trailing edge flap, although it will be understood that the present invention is not limited to flaps of the specific type shown in the drawings.

A straight guide track 8, which may be of channel cross-section, is fixedly supported to the wing structure and extends downwardly and rearwardly to a point slightly below and aft of the trailing edge 5t of the wing. A flap carriage 9 of substantially elongated L-shape is provided at its upper portion with a plurality of pivotally mounted rollers 10 which are free to move in a rectilinear path along the guide track 8. The lower or depending leg of the flap carriage 9 is provided with a pivotal connection 11 at which the flap 6 is supported. The flap is provided with a torque tube 12 to which is fixedly attached the torque tube horn or arms 13 extending forwardly and rearwardly from the torque tube 12 and contained almost completely within the profile of the flap 6. It will be understood that the torque tube 12 and its arm member 13 is fixedly supported from the flap structure and moves with the flap about the pivot 11 from which the flap is suspended from the carriage 9.

The position of the flap 6 about its pivotal suspension 11 is controlled by the knuckle assembly 14—15 connected to the flap forward of the pivot 11 and the spring cartridge or collapsible strut element 20 connected to the flap aft of its suspension pivot 11. The knuckle assembly 14—15 is comprised of a pair of articulated triangular-shaped links 14 and 15, the former being pivotally attached to the wing structure adjacent its upper surface at the pivot 16 and the links 14 and 15 being intermediately hinged by means of the pivot 17. The lower terminal of the link 15 is pivotally connected at the pivot 18 to the forward terminal of the torque arm 13 adjacent the leading edge of the flap 6. The links 14 and 15, which are shown partially "broken" or opened in Fig. 1, are provided with abutting intermediate faces 19 against which they may be closed as shown in Figs. 2 and 3.

Figure 4:
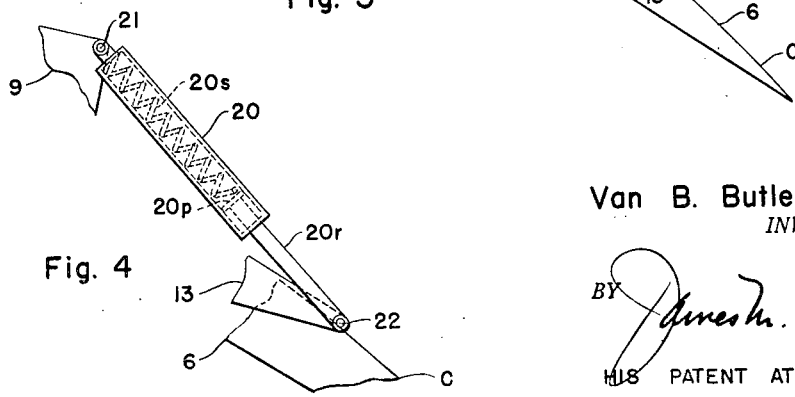
Fig. 4 is an enlarged detail view of the unloading element in the fully extended position of the flap shown in Fig. 3.

The spring cartridge or resiliently collapsible strut element 20 is pivotally connected by the pivot 21 to the upper aft corner of the flap carriage 9 and has its opposite terminal pivotally connected to the aft terminal of the flap torque arm 13 at the pivotal connection 22 on the flap. The construction of the resiliently collapsible strut element 20 may be more clearly seen in Fig. 4 in which it will be noted that the cylinder or housing portion encloses a compression coil spring 20s which reacts between the upper end of the housing pivotally connected to the flap carriage 9 at the pivot 21 and bears against the plate or abutment disc 20p at the inner end of the extension rod 20r. The outer or lower terminal of the extension rod 20r is pivotally connected at 22 to the torque arm portion 13 fixedly attached to the flap 6. The member 20 accordingly becomes a variable length strut between its pivotal terminal connections 21 and 22 and normally will elongate itself to a maximum distance between the pivots 21 and 22 under the influence of the compression spring 20s unless certain external forces are applied which tend to move the pivots 21 and 22 closer together.

The actuating means for the flap 6 includes a fluid motor 23 of the extensible type pivotally mounted upon the aircraft wing structure to swing about the axis of the pivot 24, the motor including a piston element 25 connected at its outer terminal to the flap carriage 9 at the pivot 26. Suitable flexible fluid connections 27 are provided to the cylinder of the motor 23 and it will be understood that pressure tending to move the piston and its attached piston rod 25 outwardly and rearwardly will impart translatory movement rearwardly and downwardly to the flap carriage 9 as guided by its rollers 10 along the straight track 8 from its retracted position A of the flap in Fig. 1, to the partially extended position B of the flap in Fig. 2, as well as the fully extended loaded and unloaded positions C and D of Fig. 3. A stop pad or block 28 is fixedly attached to the aircraft wing structure adjacent the upper skin surface to provide a limit stop for the clockwise rotation of the knuckle element 14 about its fixed pivot 16.

The operation of the present flap mounting and operating mechanism is as follows: The flap 6 is shown in Fig. 1 in its fully retracted and faired position with respect to the wing trailing edge and in this retracted position A of the flap the knuckle assembly 14—15 is in a partially opened attitude about its intermediate pivot 17 with the element 14 bearing against the stop 28. The pivot 18 of the knuckle element 15 has been drawn forwardly by the flap carriage 9 to its extreme forward position at the forward limit of travel along the track 8 and the forward pull on the flap pivot 11 is reflected in a tendency of the knuckle member 15 to move the trailing portion of the flap 6 upwardly thereby compacting the spring cartridge 20 permitting a close approach of the terminal pivots 21 and 22.

In order to extend the flap 6 to its partially extended position B as shown in Fig. 2, fluid pressure is applied to the hydraulic motor 23 causing the flap carriage 9 to be moved rearwardly along the track 8 from the position shown in Fig. 1 to that shown in Fig. 2. The leading edge of the flap initially follows an arcuate path indicated in Fig. 2 by L, having the pivot 17 of the knuckle assembly 14—15 as its center while this pivot is held adjacent the stop 28. As the pivot 18 at the lower end of the knuckle element 15 is swung rearwardly with the leading edge of the flap, the knuckle halves 14 and 15 are caused to close at their abutting face 19 to thereby act as a single compression member causing the leading edge of the flap to approximate a secondary arcuate path having the pivot 16 as a center. The ability of the knuckle assembly 14—15 to take compression, or to resist further approach of the pivots 16 and 18, prevents the spring cartridge 20 from extending beyond its initial compacted condition and the flap 6 is caused to move rearwardly and downwardly into the partially extended position B. During this partial extension of the flap its trailing edge is caused to move rearwardly and downwardly approximately along the lines of the initial outline for the trailing edge, the succeeding portion of which is indicated by the letter T in Fig. 2. In the relationship of the flap with respect to the wing 5 as shown in Fig. 2, the flap provides for additional lift with small increase in drag during take-off or high attitude cruising conditions of the airplane.

When it is desired to extend the flap into its full down position C, from the partially extended position B, the fluid motor 23 is actuated to further extend the piston portion 25 which, through its pivotal connection at 26, causes the flap carriage 9 to be moved to its extreme rearward position along the guide track 8. During this secondary extension movement the knuckle assembly 14—15 remains closed as in its position B of Fig. 2 and the spring cartridge 20 is permitted to extend to thereby impart rotation in the clockwise direction to the flap 6 about its pivotal mounting 11. This downward rotation of the flap is limited only by the ability of the knuckle assembly 14—15 to resist compression or oppose further approach of the movable pivot 18 toward the fixed pivot 16. In the "full-down" position of the flap as indicated at C, the spring cartridge 20 resists compression to a sufficient extent to withstand the normal predetermined air loads to which the flap 6 may be subjected during such conditions as landing, take-off or other low-speed flight conditions where increased lift and drag are desired. However, when the air loads upon the flap 6 exceed these predetermined amounts, the flap is caused to rotate in the counterclockwise direction about its pivot 11 against the compression of the spring 20s within the spring cartridge 20, the leading edge of the flap dropping at the same time to open or unfold the knuckle assembly 14—15 to thereby support the leading edge of the flap 6 in its unloaded or deflected position D in which it is substantially aligned in the chordwise sense with the main wing 5 with a relatively small angle of attack to the direction of flight.

In order to return the flap 6 from either position C or D to its partially retracted position B, or to its fully retracted position A, it is merely necessary to actuate the fluid motor 23 such that the pivotal connection 26 to the flap carriage 9 is caused to move forwardly to the desired position. As the carriage 9 moves forwardly from its position in Fig. 3 with the flap in its fully down position C, the upward and forward force exerted at the flap pivot 11, reacting against the forward pivot 18, which resists compression or movement toward the pivot 16 due to the closed attitude of the knuckle assembly 14—15, causes compacting of the spring 20s within the compressible strut 20 and return of the flap and its supporting elements to the relationship shown at B in Fig. 2. On the other hand, should the flap be retracted from its unloaded position D in Fig. 3, in which the compressible strut 20 is already compacted, forward movement of the carriage and the flap pivot 11 toward the pivot 16 causes closing of the knuckle assembly 14—15 until the flap and all of its associated supporting elements attain the positions shown in Fig. 2.

As the flap 6 is retracted from its partially extended position B, the spring cartridge 20 is maintained in its compacted condition due to the ability of the knuckle assembly 14—15 to resist compression, or approach of its pivots 16 and 18, and the knuckle assembly is rotated as a unit in the clockwise direction about the pivot 16 as the carriage and the flap move bodily forwardly. During this portion of the retracting movement, the leading edge of the flap 6 follows an arcuate path about the pivot 16 as a center until the back of the knuckle link 14 reaches and bears against the stop 28, and the knuckle assembly opens about its pivot 17. During this opening period, the leading edge of the flap and the pivot 18 will follow an arcuate path with pivot 17 as a center until the flap reaches its fully retracted position in which it is resiliently maintained by the tendency of the spring 20s within the spring cartridge 20 to expand, tending to push the pivot 22 downwardly and to serve as a "bungee" element to bring the leading edge of the flap upwardly against its recess 7 in the wing 5.

It will be understood that one or more actuating and supporting mechanisms of the type disclosed may be used upon a single wing flap and in installations where the flap is of relatively long span several actuating and supporting units will be required. While limit stops have not been indicated on the track 8 for the slot carriage 9, it will be understood that suitable stops may be provided at the forward and rearward extremities of carriage travel in order to define the extreme positions of the flap supporting mechanism. It will also be understood that while a hydraulic piston cylinder type motor has been shown and described, the invention is not necessarily limited thereto, and electrical or mechanical actuating means of other available types may be used for the translatory movement of the flap carriage and the associated mechanism.

Other forms and modifications of the present invention which may occur to those skilled in the art after reading the foregoing description are intended to come within the scope and spirit of the present invention as more particularly defined in the appended claims.

I claim:

1. In a flap mounting arrangement, a relatively fixed wing, a carriage slidably mounted upon said wing, for movement in a chordwise direction, a movable trailing edge flap, means pivotally supporting said flap from said slidable carriage, means including a resilient strut element having terminal portions pivotally interconnecting said flap with said carriage arranged for raising the nose portion of said flap about said flap support pivot means and a foldable linkage having terminal portions pivotally interconnecting said wing with said flap for holding said flap nose portion down in its retracted and partially extended positions.

2. In an aircraft flap arrangement, a relatively fixed wing, a carriage element slidably mounted upon said wing, a movable flap, means pivotally supporting said flap from said carriage element beneath the trailing portion of said wing, resilient means interposed between said carriage element and said flap arranged to urge rotation of said flap about its said pivotal support means into a high angle of attack attitude and means carried by said wing pivotally engaged with said flap arranged to oppose said resilient means in all but the full-down high-lift attitude of said fully extended flap.

3. In an aircraft flap arrangement, a relatively fixed wing, flap carriage means movable in a chordwise direction with respect to said wing, a movable undersurface trailing edge flap, means pivotally supporting said flap from said flap carriage, resilient means interposed between said flap carriage and said flap at a point aft of said flap support pivot urging the aft portion of said flap downwardly away from the undersurface of the wing trailing edge, and articulated link means having opposed relatively movable terminals pivotally interconnecting said wing with said flap for cooperating with said movable carriage for positioning said flap with respect to said wing.

4. In a flap mounting arrangement, a relatively fixed wing, a carriage slidably mounted upon said wing, a flap movable between retracted and extended positions, means pivotally supporting said flap from said slidable carriage, resilient means having opposed portions pivotally interconnecting said flap with said carriage arranged for raising the nose portion of said flap about said flap support pivot means and a foldable linkage having opposed terminal portions pivotally interconnecting said wing with said flap for holding said flap nose portion down in its retracted and partially extended positions, movement of said carriage and said flap into a fully extended rearward position causing rotation of said foldable linkage into a position in which said flap nose is lifted into a high lift attitude of said flap with the assistance of said resilient means.

5. In a flat positioning arrangement, a relatively fixed wing, a carriage slidably mounted upon said wing, a movable flap, means pivotally supporting said flap from said carriage, and means for positioning said flap in its retracted and extended positions dependent upon the position of said carriage with respect to said wing including a foldable linkage having opposed terminals pivotally interconnecting said wing with said flap at a point forward of said flap support pivot means and a resiliently compressible element interposed between and pivotally interconnecting said carriage with said flap at a point aft of said flap support pivot means.

6. In an aircraft having a wing, a movable undersurface flap, a carriage element slidably mounted adjacent the trailing edge of said wing, said carriage element having a pivotal mounting for the support of said flap in a plurality of positions, foldable link means having a common intermediate pivot and separate spaced terminals pivotally interconnecting the leading portion of said flap with said wing, stop means on said wing engageable with said foldable means for limiting upward movement of said flap leading edge toward said wing and resilient means interposed between and pivotally interconnecting said carriage element with a trailing portion of said flap for normally urging said flap trailing portion downwardly about said flap pivotal mounting.

7. In an aircraft flap arrangement, a relatively fixed wing, a carriage element slidably mounted upon said wing for movement in a chordwise direction with respect to said wing, a movable flap, means pivotally supporting said flap from said carriage element and beneath said wing, resilient means interposed between said carriage element and said flap for urging downward rotation of said flap about said pivotal support means into a high angle of attack attitude of said flap, and swingable means including a pair of articulated portions having spaced terminals pivotally interconnecting said wing with said flap for maintaining said flap in a neutral attitude in its retracted and partially extended positions, said swingable means arranged upon extended rearward movement of said carriage element and said flap with respect to said wing to permit raising of said flap nose portion into a full-down high-lift attitude of said flap in which said resilient means is arranged to unload said flap of predeterminedly high air loads.

8. In an aircraft wing flap arrangement, a relatively fixed wing, a movable trailing edge flap, a track carried by said wing in a fore and aft direction, a carriage movable along said track and having a pivotal connection for the support of said flap, means for moving said carriage along said track, a resilient variable-length element interposed between said carriage and the portion of said flap aft of said carriage pivot, and a knuckle linkage including a pair of links connected at a common intermediate pivot, the opposed terminals of said links pivotally interconnecting said wing with a portion of said flap forward of said carriage pivot, said knuckle linkage being limitably foldable for causing said variable-length element to reach its extended length in a high angle of attack attitude of said flap in which said variable-length element resiliently relieves said flap of predeterminedly high loads concurrent with an unfolding movement of said knuckle linkage.

9. In combination with an airfoil and a movable flap, carriage means arranged for fore and aft movement with respect to said airfoil, said flap pivotally supported from said carriage means at a point intermediate the leading and trailing portions of said flap for rocking rotation about a horizontal spanwise axis, resilient extensible means pivotally connected at one terminal to said carriage means and at its opposite terminal to the trailing portion of said flap, foldable linkage means pivotally connected at a first terminal to said airfoil and at an opposite terminal to the leading portion of said flap, said linkage means having a common pivotal connection intermediate said terminals and adjacent stop means to limit its folding, and means for extending said carriage means and said flap rearwardly from said retracted position to an extended operative position in which said resilient extensible means causes the trailing portion of said flap to be rotated downwardly to a high angle of attack attitude of said flap with respect to said airfoil, said downward rotation of said flap being limited by said stop means adjacent said intermediate pivotal connection of said foldable linkage connected to the leading portion of said flap.

10. In combination with an airfoil and an extensible trailing edge flap normally nested in a retracted relationship beneath the trailing portion of said airfoil, rectilinear guide track means mounted in said airfoil above said flap when in said retracted position, carriage means mounted for fore and aft rectilinear movement along said guide track means, said flap pivotally supported from said carriage means at a point intermediate its leading and trailing portions, said pivotal flap support arranged about a horizontal spanwise axis for changes in the angle of attack of said flap with respect to said airfoil, a resiliently extensible means pivotally connected at one terminal to said carriage means and at its opposite terminal to the trailing portion of said flap, foldable linkage means pivotally connected at a first terminal to said airfoil and at an opposite terminal to the leading portion of said flap, said linkage means capable of withstanding compression between said terminals in its folded condition only and means for extending said carriage means and said flap rearwardly from said retracted position to its fully extended operative position in which said extensible means causes the trailing portion of said flap to be rotated downwardly to a high angle of attack attitude of said flap with respect to said airfoil to a position at which it is maintained by the said folded linkage, said rotation of said flap being limited during said rearward movement at all intermediate positions by said foldable linkage connected to the leading portion of said flap.

11. In combination with an airfoil and a movable flap normally faired in a retracted relationship beneath the trailing portion of said airfoil, rectilinear guide track means mounted in said airfoil above said flap when in said retracted position, carriage means mounted for fore and aft movement along said guide track means, said flap pivotally supported from said carriage means at a point intermediate its leading and trailing portions for rotation about a horizontal spanwise axis for change in its angle of attack, a normally extensible resilient means pivotally connected at one terminal to said carriage means and at its opposite terminal to the trailing portion of said flap, linkage means including a pair of intermediately pivoted links pivotally connected at a first terminal to said airfoil and at an opposite terminal to the leading portion of said flap, stop means carried by said linkage means to limit its folding movement and means pivotally connected to said carriage means for extending said flap rearwardly from said retracted position to an extended operative position in which said extensible resilient means causes the trailing portion of said flap to be rotated downwardly to a high angle of attack attitude of said flap with respect to said airfoil, said downward rotation of said flap being limited by said stop means carried by said foldable linkage means connected to the leading portion of said flap.

12. In an aircraft, an airfoil, an extensible flap normally faired in a retracted relationship beneath the trailing portion of said airfoil, carriage means slidably mounted in said airfoil above said flap when in said retracted position for fore and aft translatory movement with respect to said airfoil, said flap pivotally supported from said translatory carriage means at a point intermediate the leading and trailing portions of said flap for rotation about a horizontal spanwise axis for variation of its angle of attack, resiliently extensible means pivotally connected at one terminal to said carriage means and at its opposite terminal to a trailing portion of said flap, linkage means pivotally connected at a first terminal to said airfoil and at an opposite terminal to a leading portion of said flap, said linkage means including a two-part pivotaly interconnected breaking strut foldable to a compression withstanding position and means for imparting translatory movement to said carriage means for extending said flap rearwardly from said retracted position to an extended operative position in which said extensible means causes the trailing portion of said flap to be rotated downwardly to a high angle of attack attitude of said flap with respect to said airfoil in which it is maintained by the folded position of said linkage means, said extensible means being resiliently compressible upon said flap being subjected to aerodynamic loads in excess of a predetermined magnitude to thereby decrease the angle of attack of said extended flap.

13. In an aircraft, an airfoil, a movable flap normally nested in a retracted relationship beneath the trailing edge of said airfoil, guide track means mounted in said airfoil above said flap when in said retracted position, carriage means mounted for fore and aft movement along said guide track means, said flap pivotally supported from said carriage means at a point intermediate its leading and trailing portions for rotation with respect to said carriage means about a horizontal spanwise axis and for movement with said carriage means in a generally fore and aft chordwise plane, a resiliently extensible means pivotally connected at one terminal to the airfoil and at its opposite terminal to the trailing portion of said flap, intermediately pivoted foldable linkage means pivotally connected at a first terminal to said airfoil and at an opposite terminal to the leading portion of said flap, said linkage means having stop portions to limit folding to a compression withstanding condition and means for extending said carriage means and said flap rearwardly from said retracted position to its extended operative position in which said extensible means causes the trailing portion of said flap to be rotated downwardly to a high angle of attack attitude of said flap with respect to said airfoil at which said downward rotation is opposed by said folded condition of said linkage means, said resiliently extensible means being compressible upon said flap being subjected to loads in excess of a predetermined magnitude to thereby decrease the angle of attack of said extended flap.

14. In an aircraft, including an airfoil, an extensible trailing edge flap normally nested in a retracted relationship beneath the trailing portion of said airfoil, guide track means mounted in said airfoil above said flap when in said retracted position, carriage means mounted for fore and aft movement along said guide track means, said flap pivotally supported from said carriage means at a point intermediate its leading and trailing portions for rotation about a horizontal spanwise axis and for movement with said carriage means in a generally fore and aft chordwise plane, and resiliently extensible means pivotally connected at one terminal to the airfoil and at its opposite terminal to the trailing portion of said flap, the improvement comprising foldable linkage means pivotally connected at a first terminal to said airfoil and at an opposite terminal to the leading portion of said flap, and means for extending said carriage means and said flap rearwardly from said retracted position to its extended operative position in which said extensible means causes the trailing portion of said flap to be rotated downwardly to a high angle of attack attitude of said flap with respect to said airfoil to a position determined by the folding of said linkage means, said resiliently extensible means being compressible upon said flap being subjected to loads in excess of a predetermined magnitude to thereby decrease the angle of attack of said extended flap in an unfolded condition of said linkage means.

15. In a flap mounting arrangement, the combination with a relatively fixed wing, a carriage slidably mounted upon said wing for movement in a chordwise direction, a movable trailing edge flap, and means pivotally supporting said flap from said slidable carriage, of a resilient strut element having terminal portions pivotally interconnecting said flap with said carriage arranged for resiliently biasing the trailing portion of said flap into a downward position about said flap support pivot means and a foldable linkage having terminal portions pivotally interconnecting said wing with said flap nose portion limiting the upward movement of said flap nose portion in its retracted, extended positions and intermediate position.

16. In an airplane, an airfoil having a trailing edge flap, carriage means translatable in a fore and aft direction with respect to said airfoil, said flap pivotally supported from said carriage means for rearward and downward translation therewith and for rocking movements about a transverse axis for increased angle of attack with respect to said airfoil, foldable suspension link means including a pair of links pivotally interconnected at their adjacent terminals and pivotally connected to said airfoil and to the leading portion of said flap at the opposite terminals of said link means, and resiliently extensible spring means pivotally connected at one terminal to said translatable carriage means and at its opposite terminal to the trailing portion of said flap arranged in such manner that in a forward position of said carriage means said flap is supported thereby in a faired retracted position beneath the trailing portion of said airfoil in which it is maintained by the resistance to compression of one of said links of said suspension link means in contact with said airfoil and the said resiliently extensible spring means, in a fully extended position said flap is rotated by said extensible spring means into a high angle of attack defined by the resistance to compression of said link means in a folded position and in an intermediate position of said carriage means said flap is maintained by said folded link means and said extensible spring means in an attitude substantially parallel to but lower than said retracted position.

VAN B. BUTLER.

REFERENCES CITED

The following references are of record in the file of this patent:

UNITED STATES PATENTS

| Number | Name | Date |
| --- | --- | --- |
| 1,830,019 | Davis | Nov. 3, 1931 |
| 1,841,804 | Hall | Jan. 19, 1932 |
| 2,086,085 | Lachmann et al. | July 6, 1937 |
| 2,138,753 | Youngman | Nov. 29, 1938 |
| 2,147,360 | Zaparka | Feb. 14, 1939 |
| 2,348,150 | Richter | May 2, 1944 |